(12) United States Patent
Park et al.

(10) Patent No.: US 9,909,931 B2
(45) Date of Patent: Mar. 6, 2018

(54) TEMPERATURE SENSOR

(71) Applicant: SK hynix Inc., Icheon (KR)

(72) Inventors: Kyu Tae Park, Yongin (KR); Marco Passerini, Lozza (IT)

(73) Assignee: SK HYNIX INC., Icheon (KR)

( * ) Notice: Subject to any disclaimer, the term of this patent is extended or adjusted under 35 U.S.C. 154(b) by 410 days.

(21) Appl. No.: 14/695,829

(22) Filed: Apr. 24, 2015

(65) Prior Publication Data

US 2016/0146677 A1 May 26, 2016

(30) Foreign Application Priority Data

Nov. 25, 2014 (KR) .................. 10-2014-0165290

(51) Int. Cl.
*G01K 7/16* (2006.01)
(52) U.S. Cl.
CPC ...................... *G01K 7/16* (2013.01)
(58) Field of Classification Search
CPC ............ G01K 7/02; G01K 3/005; G01K 3/10; G01K 7/42; G01K 7/22; G01K 7/10; G01K 13/02; G01K 2205/04; G01K 11/32; G01K 13/00; G01K 2013/024; H01R 4/023; H01R 4/029; H01R 43/28; B23K 31/02; G01F 1/00; G01N 25/72; G01N 33/02; H05K 7/20945; F24F 11/0012; F24F 2001/0052; F24F 2011/0093; F24F 11/022; H02M 1/32; H02M 1/38; H02M 1/53806; H01C 7/008; H01C 17/00; G01R 31/2642; G01R 31/048; G01R 31/40; G01J 5/004; G01J 5/043; G01J 5/082; G01J 5/08; A47J 43/287; F16B 2/02; F16B 1/00; F16B 47/00; F16B 2001/0035; F16L 32/02; F16L 31/00; F16L 347/00; F16M 13/02; F16M 13/022
See application file for complete search history.

(56) References Cited

U.S. PATENT DOCUMENTS 7,888,987 B2 * 2/2011 Horie .................. H03F 1/301
327/538
2005/0264345 A1 * 12/2005 Ker .................... G05F 3/30
327/539

(Continued)

FOREIGN PATENT DOCUMENTS

KR 10-0843226 B1 6/2008
KR 10-2013-0045730 A 5/2013

OTHER PUBLICATIONS

Sung Wook Choi et al., "A Cell Current Compensation Scheme for 3D NAND Flash Memory", Presentation at IEEE Asian Solid-State Circuits Conference 2015, Nov. 11, 2015, pp. 1, 27-28, 60-86, IEEE, Xiamen, Fujian, China.

*Primary Examiner* — Manish S Shah

(57) ABSTRACT

A temperature sensor includes a first current generating circuit configured to generate a first current being constant regardless of temperature changes, a cascode circuit configured to generate a cascode voltage, a second current generating circuit configured to generate a second current being in inverse proportion to temperature, and a compensated voltage output circuit configured to output a compensated voltage having various temperature coefficients in response to the first current and the second current.

20 Claims, 7 Drawing Sheets

(56) References Cited

U.S. PATENT DOCUMENTS

| | | | |
|---|---|---|---|
| 2007/0296391 A1* | 12/2007 | Bertin | G01R 35/005 |
| | | | 323/303 |
| 2010/0072972 A1* | 3/2010 | Yoshikawa | G05F 3/30 |
| | | | 327/513 |
| 2012/0119724 A1* | 5/2012 | Kikuchi | G05F 3/30 |
| | | | 323/313 |
| 2012/0133422 A1* | 5/2012 | Pereira da Silva, Jr. | G01K 7/01 |
| | | | 327/512 |
| 2014/0146428 A1* | 5/2014 | Pansier | H03K 17/0822 |
| | | | 361/86 |

* cited by examiner

TEMPERATURE SENSOR

CROSS-REFERENCE TO RELATED APPLICATION

The present application claims priority to Korean Patent Application Number 10-2014-0165290 filed on Nov. 25, 2014, in the Korean Intellectual Property Office, the entire disclosure of which is incorporated by reference herein.

BACKGROUND

1. Technical Field

Embodiments of the present disclosure relate to a temperature sensor and, more particularly, to a temperature sensor outputting a compensated voltage by compensating for temperature changes.

2. Related Art

A semiconductor system may include a memory block including a plurality of memory cells and a page buffer coupled to the memory block through bit lines. When the semiconductor system performs a program, read, or erase operation, the temperature of the semiconductor system may be increased due to characteristics of each operation. For example, when data stored in memory cells is read during the read operation of the semiconductor system, a voltage or current of bit lines may be changed depending on program states of the memory cells. The page buffer may determine the program states of the memory cells according to the changed voltage or current of the bit lines. However, because the voltage or current changes with temperature, the reliability of determining the program states of the memory cells may be reduced.

BRIEF SUMMARY

Embodiments of the present disclosure are directed to a temperature sensor outputting a compensated voltage controlled according to temperature.

A temperature sensor according to an embodiment of the present disclosure may include a first current generating circuit suitable for generating a first current being constant regardless of temperature changes, a cascode circuit suitable for generating a cascode voltage, a second current generating circuit suitable for generating a second current being in inverse proportion to temperature, and a compensated voltage output circuit suitable for outputting a compensated voltage having various temperature coefficients in response to the first current and the second current.

A temperature sensor according to another embodiment of the present disclosure may include a first current generating circuit suitable for generating a first current in response to a bandgap reference voltage, wherein the first current is constant regardless of temperature changes, a cascode circuit suitable for generating a cascode voltage in response to the first current, a second current generating circuit suitable for generating a second current in response to the cascode voltage, wherein the second current is in inverse proportion to temperature, and a compensated voltage output circuit suitable for outputting a compensated voltage having various temperature coefficients in response to the first current and the second current.

DETAILED DESCRIPTION

Hereinafter, embodiments of the present disclosure will be described in detail with reference to the accompanying drawings. Embodiments may, however, be embodied in different forms and should not be construed as limited to the embodiments set forth herein. Rather, these embodiments are provided so that this disclosure is thorough and complete and fully conveys the scope of the disclosure to one skilled in the art.

In this specification, 'connected/coupled' represents that one component is directly coupled to another component or indirectly coupled through another component.

In this specification, it will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

A person of skill in the art in light of the teachings and disclosures herein would understand that the term "switch" as used herein may refer to a transistor configured to operate in either of a cutoff region and a saturation region, or operate in a linear region. The transistor may include one or more of an n-channel or p-channel Metal Oxide Semiconductor Field Effect Transistor (MOSFET), a Junction FET (JFET), a Bipolar Junction Transistor (BJT), and the like.

Figure 1:
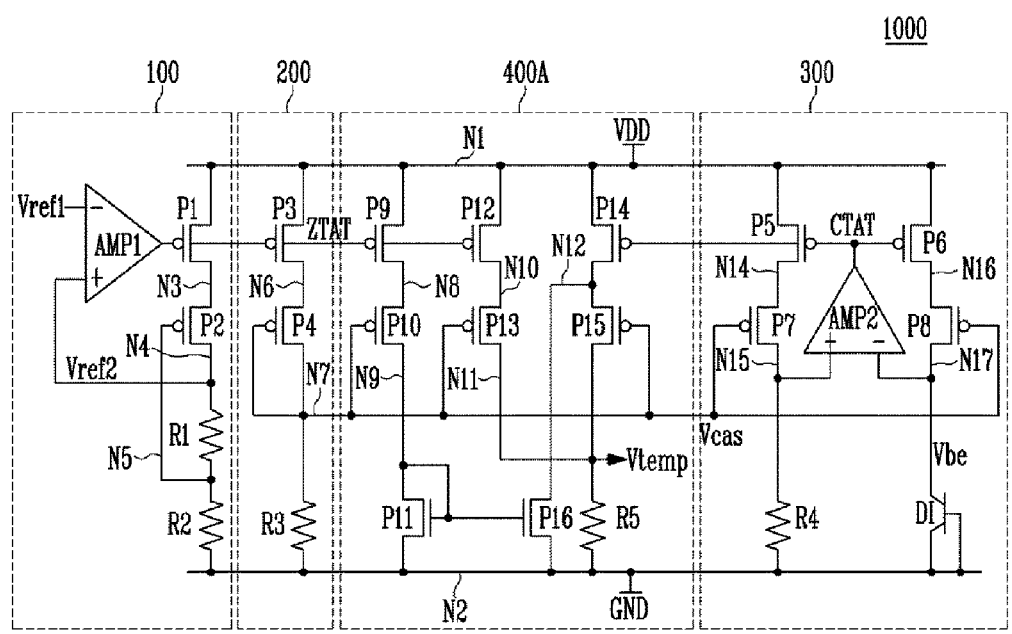
FIG. 1 is a circuit diagram illustrating a temperature sensor according to an embodiment.

FIG. 1 is a circuit diagram illustrating a temperature sensor 1000 according to an embodiment.

Referring to FIG. 1, the temperature sensor 1000 may include a first current generating circuit 100, a cascode circuit 200, a second current generating circuit 300 and a compensated voltage output circuit 400A.

The first current generating circuit 100 may be configured to generate a first current $I_{ZTAT}$ which is constant regardless of temperature changes. More specifically, the first current generating circuit 100 may include a first amplifier AMP1, a first switch P1, a second switch P2, a first resistor R1 and a second resistor R2. The first amplifier AMP1 may include a differential amplifier. The first amplifier AMP1 may use a difference between a bandgap reference voltage Vref1 and a feedback reference voltage Vref2 to output a voltage value to a zero-dependence-on-absolute-temperature (ZTAT) node. The first switch P1, the second switch P2, the first resistor R1 and the second resistor R2 may be coupled in series between a first node N1 to which a power voltage VDD is applied and a second node N2 to which a ground terminal GND is coupled.

The first switch P1 may include a PMOS transistor coupled between the first node N1 and a third node N3 and having a gate connected to the ZTAT node. A turn-on level of the first switch P1 may be controlled by the voltage value provided to the ZTAT node by the first amplifier AMP1. The second switch P2 may include a PMOS transistor coupled between the third node N3 and a fourth node N4. A potential of the fourth node N4 may be the feedback reference voltage Vref2. The first resistor R1 may be coupled between the fourth node N4 and a fifth node N5, and the second resistor R2 may be coupled between the fifth node N5 and the second node N2. A gate of the second switch P2 may be coupled to the fifth node N5, and a turn-on level of the second switch P2 may be controlled in response to a potential of the fifth node N5. In other words, the second switch P2 may operate in response to the potential of the feedback reference voltage Vref2 divided by the first resistor R1 and the second resistor R2.

The first amplifier AMP1 controls the voltage value of the ZTAT node to produce a voltage value of the feedback reference voltage Vref2 that is substantially identical to a voltage value of the constant bandgap reference voltage Vref1 regardless of temperature changes. Therefore, the first current $I_{ZTAT}$ may be obtained using Equation 1:

$$I_{ZTAT} = \frac{Vref1}{R1+R2} \quad \text{(Eq. 1)}$$

Referring to Equation 1, the first current $I_{ZTAT}$ may be in proportion to the bandgap reference voltage Vref1 and in inverse proportion to a resistance value (R1+R2) of the first and second resistors R1 and R2.

The cascode circuit 200 may be configured to output a stable cascode voltage Vcas in response to the voltage value provided to the ZTAT node. More specifically, the cascode circuit 200 may include a third switch P3, a fourth switch P4 and a third resistor R3. The third switch P3 may include a PMOS transistor coupled between the first node N1 and a sixth node N6 and having a gate coupled to the ZTAT node. A turn-on level of the third switch P3 may be controlled by the voltage value of the ZTAT node. In an embodiment, the third switch P3 may be substantially identical to the first switch P1, so that the voltage value of the ZTAT node produces a current flowing through the third switch P3 having a same magnitude as a magnitude of the first current $I_{ZTAT}$ flowing through the first switch P1.

The fourth switch P4 may include a PMOS transistor coupled between the sixth node N6 and a seventh node N7, and a turn-on level thereof may be controlled in response to a potential of the seventh node N7. A voltage applied to the seventh node N7 when the fourth switch P4 is turned on may be referred to as the cascode voltage Vcas. The third resistor R3 may be coupled between the seventh node N7 and the second node N2.

The cascode voltage Vcas may be obtained by Equation 2 as follows:

$$Vcas = I_{ZTAT} R3 \quad \text{(Eq. 2)}$$

Referring to Equation 2, the cascode voltage Vcas may be in proportion to the first current $I_{ZTAT}$ and a resistance value of the third resistor R3. The cascode voltage Vcas is provided as a bias voltage to cascode stages of the second current generating circuit 300 and the compensated voltage output circuit 400A.

The second current generating circuit 300 may be configured to generate a second current $I_{CTAT}$ having a magnitude in inverse proportion to temperature. More specifically, the second current generating circuit 300 may include a fifth switch P5, a sixth switch P6, a seventh switch P7, an eighth switch P8, a second amplifier AMP2, a fourth resistor R4, and a diode DI. The second amplifier AMP2 may include a differential amplifier. The fifth switch P5 may include a PMOS transistor coupled between the first node N1 and a fourteenth node N14, and a turn-on level thereof may be controlled by a voltage value of a complementary-to-temperature (CTAT) node that is produced by the second amplifier AMP2. The seventh switch P7 operates as a cascode stage and may include a PMOS transistor coupled between the fourteenth node N14 and a fifteenth node N15 and having a gate biased by the cascode voltage Vcas.

The sixth switch P6 may include a PMOS transistor coupled between the first node N1 and a sixteenth node N16, and a turn-on level thereof may be controlled by the voltage value of the CTAT node. The eighth switch P8 operates as a cascode stage and may include a PMOS transistor coupled between the sixteenth node N16 and a seventeenth node N17 and having a gate biased by the cascode voltage Vcas.

The second amplifier AMP2 operates to control a voltage value of the fifteenth node N15 to be substantially identical to a voltage value of the seventeenth node N17 by controlling the voltage value of the CTAT node. The fourth resistor R4 may be coupled between the fifteenth node N15 and the second node N2, and the diode DI may be coupled between the seventeenth node N17 and the second node N2. In an embodiment, the diode DI may be a forward diode in a direction from the second node N2 to the seventeenth node N17, for example, a Bipolar Junction Transistor (BJT) diode. A voltage applied to the seventeenth node N17 which is an output node of the diode DI may be defined as a diode voltage Vbe.

Because the second current generating circuit 300 operates to produce a voltage value of the fifteenth node N15 substantially identical to a voltage value of the seventeenth node N17, that is, to the diode voltage Vbe, the second current $I_{CTAT}$ flowing through the fifth switch P5 may obtained by Equation 3:

$$I_{CTAT} = \frac{Vbe}{R4} \quad \text{(Eq. 3)}$$

Referring to Equation 3, the second current $I_{CTAT}$ may be in proportion to the diode voltage Vbe and in inverse proportion to a resistance value of the fourth resistor R4. The diode voltage Vbe may decrease as temperature increases. Therefore, current flowing through the fourth resistor R4 may also decrease. However, since the fifth to eighth switches P5 to P8 of the second current generating circuit 300 are connected in a cascode configuration, the diode voltage Vbe may maintain high linearity and output stability.

The compensated voltage output circuit 400A may be configured to output a compensated voltage Vtemp having various temperature coefficients obtained by combining the first current $I_{ZTAT}$ and the second current $I_{CTAT}$. The compensated voltage output circuit 400A may include a single cascode current mirror circuit. For example, the compensated voltage output circuit 400A may include a ninth switch P9, a tenth switch P10, an eleventh switch P11, a twelfth switch P12, a thirteenth switch P13, a fourteenth switch P14, a fifteenth switch P15, a sixteenth switch P16 and a fifth resistor R5.

More specifically, the ninth switch P9 may include a PMOS transistor coupled between the first node N1 and an eighth node N8 and having a gate connected to the ZTAT node. A turn-on level of the ninth switch P9 may be controlled by the voltage value of the ZTAT node.

The tenth switch P10 may include a PMOS transistor coupled between the eighth node N8 and a ninth node N9 and having a gate biased using the cascode voltage Vcas. The eleventh switch P11 may include an NMOS transistor coupled between the ninth node N9 and the second node N2 and having a gate connected to the ninth node N9.

The twelfth switch P12 may include a PMOS transistor coupled between the first node N1 and a tenth node N10, and a turn-on level thereof may be controlled by the voltage value of the ZTAT node. In an embodiment, the fourteenth switch P12, the ninth switch P9 and the third switch P3 may be substantially identical to the first switch P1, so that a current flowing through the fourteenth switch P12, the ninth switch P9, the third switch P3 and the first switch P1 mirrors the first current $I_{ZTAT}$. The thirteenth switch P13 may include a PMOS transistor coupled between the tenth node N10 and an eleventh node N11 and having a gate biased by the cascode voltage Vcas. The thirteenth switch P13 is configured to operate as a cascode stage for the twelfth switch P12.

The fourteenth switch P14 may include a PMOS transistor coupled between the first node N1 and a twelfth node N12, and a turn-on level thereof may be controlled by a voltage value of the CTAT node. In an embodiment, the fourteenth switch P14 may be substantially identical to the fifth switch P5, so that a current flowing through the sixth switch P6, the fifth switch P5 and the fourteenth switch P14 mirrors the second current $I_{CTAT}$. The fifteenth switch P15 may include a PMOS transistor coupled between the twelfth node N12 and the eleventh node N11, and having a gate biased by the cascode voltage Vcas. The fifteenth switch P15 is configured to operate as a cascode stage for the fourteenth switch P14. A current flowing through the fifteenth switch P15 is equal to the current flowing through the fourteenth switch P14 minus a current flowing through the sixteenth switch P16.

The sixteenth switch P16 may include an NMOS transistor coupled between the twelfth node N12 and the second node N2 and having a gate connected to the ninth node N9. In an embodiment, the eleventh switch P11 and the sixteenth switch P16 are substantially identical and configured to operate together as a current mirror, so that a current flowing through the sixteenth switch P16 is substantially equal to the first current $I_{ZTAT}$ flowing through the eleventh switch P11. The fifth resistor R5 may be coupled between the eleventh node N11 and the second node N2.

A current $I_{R5}$ flowing through the fifth resistor R5 is equal to the current flowing through the twelfth switch P12 plus a current flowing through the fifteenth switch P15. The current $I_{R5}$ flowing through the fifth resistor R5 is determined according to Equation 3.5:

$$I_{R5}=I_{ZTAT}+(I_{CTAT}-I_{ZTAT})=I_{CTAT} \quad \text{(Eq. 3.5)}$$

In an embodiment, variations in the compensated voltage Vtemp that could arise due to temperature coefficients of the twelfth, thirteenth, fourteenth, and fifteenth switches P12, P13, P14, and P15 and the fifth resistor R5 are counteracted by the temperature coefficients of the ninth, tenth, eleventh and sixteenth switches P9, P10, P11, and P16, so that the compensated voltage Vtemp may maintain an accurate stable level.

Figure 2:
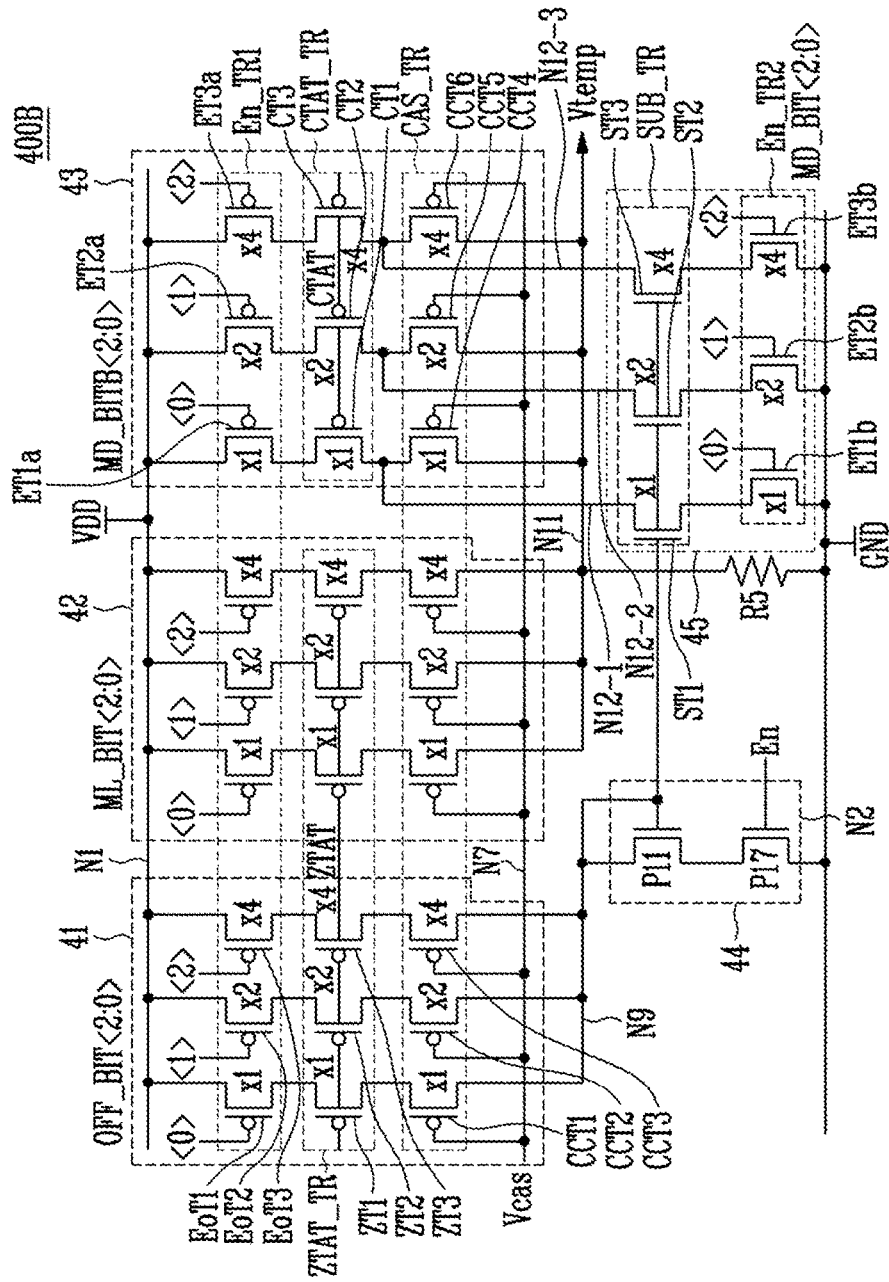
FIG. 2 is a circuit diagram illustrating another embodiment of a compensated voltage output circuit shown in FIG. 1.

FIG. 2 is a circuit diagram illustrating a compensated voltage output circuit 400B that in an embodiment may be used in place of the compensated voltage output circuit 400A shown in FIG. 1.

The compensated voltage Vtemp having the temperature coefficient may be output by the compensated voltage output circuit 400A shown in FIG. 1. However, in order to output the compensated voltage Vtemp which varies more sensitively to temperature changes, that is, has a higher temperature coefficient $\delta V/\delta T$, the compensated voltage output circuit 400B according to another embodiment is described with reference to FIG. 2.

Referring to FIG. 2, the compensated voltage output circuit 400B according to another embodiment may include a multi-cascode current mirror circuit. For example, the compensated voltage output circuit 400B may include a first trim unit 41, a second trim unit 42, a third trim unit 43, a fourth trim unit 45 and a discharge unit 44. The first trim unit 41 shown in FIG. 2 may correspond to the ninth and tenth switches P9 and P10 included in the compensated voltage output circuit 400A shown in FIG. 1. The second trim unit 42 shown in FIG. 2 may correspond to the twelfth and thirteenth switches P12 and P13 included in the compensated voltage output circuit 400A shown in the FIG. 1. The third trim unit 43 shown in FIG. 2 may correspond to the fourteenth and fifteenth switches P14 and P15 included in the compensated voltage output circuit 400A shown in FIG. 1. The fourth trim unit 45 shown in FIG. 2 may correspond to the sixteenth switch P16 included in the compensated voltage output circuit 400A shown in FIG. 1. The discharge unit 44 shown in FIG. 2 may correspond to the eleventh switch P11 included in the compensated voltage output circuit 400A shown in FIG. 1.

The first and second trim units 41 and 42 may include first enable switches En_TR1, ZTAT switches ZTAT_TR and cascode switches CAS_TR. The third trim unit 43 may include the first enable switches En_TR1, CZTAT switches CTAT_TR and the cascode switches CAS_TR. The fourth trim unit 45 may include sub-switches SUB_TR and second enable switches EN_TR2.

The first enable switches En_TR1 included in the first trim unit 41, specifically, first, second, and third offset enable transistors EoT1, EoT2, and EoT3, may perform a trimming operation in response to offset bits OFF_BIT<2:0>, and include '$K_{OFF}$' PMOS multiple transistors having different sizes, where $K_{OFF}$ is a positive integer. For convenience of explanation, FIG. 2 illustrates three multiple transistors, the first, second, and third offset enable transistors EoT1, EoT2, and EoT3. However, more than three multiple transistors may be included. When the $K_{OFF}$ multiple transistors are included, the offset bits OFF_BIT may include '$K_{OFF}$' bits <$K_{OFF}$-1:0>.

When the first offset enable transistor EoT1 having a gate to which a first offset bit OFF_BIT<0> is applied has a first size (×1), the second offset enable transistor EoT1 having a gate to which a second offset bit OFF_BIT<1> is applied may have a second size (×2) which is twice the first size, and the third offset enable transistor EoT1 having a gate to which a third offset bit OFF_BIT<2> is applied may have a fourth size (×4) which is twice the second size. In an embodiment, the first, second, and third offset enable transistors EoT1, EoT2, and EoT3 each include 1, 2, and 4 first sub-transistors connected in parallel, respectively, each first sub-transistor being substantially identical to each other.

The ZTAT switches ZTAT_TR included in the first trim unit 41, that is, first, second, and third ZTAT transistors ZT1, ZT2, and ZT3 may operate according to the first current $I_{ZTAT}$ and include '$K_{OFF}$' PMOS multiple transistors having different sizes in the same manner as the first, second, and third offset enable transistors EoT1, EoT2, and EoT3, respectively. In an embodiment, the first, second, and third ZTAT transistors ZT1, ZT2, and ZT3 each include 1, 2, and 4 second sub-transistors connected in parallel, respectively, wherein each of the second sub-transistors are substantially identical to the first switch P1 of FIG. 1. Therefore, for each of the second sub-transistors, when a current flows through that second sub-transistor, that current is substantially identical to the first current $I_{ZTAT}$, respectively.

The cascode switches CAS_TR included in the first trim unit 41, that is, first, second, and third cascode transistors CCT1, CCT2, and CCT3, are biased by the cascode voltage Vcas provided to gates thereof, and include '$K_{OFF}$' PMOS multiple transistors having different sizes in the same manner as the first enable switches En_TR1. In an embodiment, the first, second, and third cascode transistors CCT1, CCT2, and CCT3 each include 1, 2, and 4 third sub-transistors connected in parallel, respectively, each third sub-transistor being substantially identical to each other.

The multiple transistors included in the first enable switches En_TR1, the ZTAT switches ZTAT_TR and the cascode switches CAS_TR included in the first trim unit 41 may be coupled in series between the first node N1 and the ninth node N9. For example, the first offset enable transistor EoT1, first ZTAT transistor ZT1, and first cascode transistor CCT1 having the "1×" size may be coupled in series between the first node N1 and the ninth node N9, the second offset enable transistor EoT2, second ZTAT transistor ZT2, and second cascode transistor CCT2 having the "2×" size may be coupled in series between the first node N1 and the ninth node N9, and so forth. The strings of series-coupled transistors having different sizes may then be coupled in parallel between the first node N1 and the ninth node N9.

An offset trim current $I_{OFFTRIM}$ flowing into the ninth node N9 is determined according to a value of the offset bits OFF_BIT<2:0> and the first current $I_{ZTAT}$. In the embodiment of FIG. 2, when the first offset bit OFF_BIT<0> turns on the first offset enable transistor EoT1, a current equal to the first current $I_{ZTAT}$ flows through the first ZTAT transistor ZT1. When the second offset bit OFF_BIT<1> turns on the second offset enable transistor EoT2, a current equal to twice the first current $I_{ZTAT}$ flows through the second ZTAT transistor ZT2. When the third offset bit OFF_BIT<2> turns on the third offset enable transistor EoT3, a current equal to four times the first current $I_{ZTAT}$ flows through the third ZTAT transistor ZT3.

The offset trim current $I_{OFFTRIM}$ flowing into the ninth node N9 is equal to the sum of the currents flowing through the first, second, and third ZTAT transistors ZT1, ZT2, and ZT3, as shown in Equation 4, below, wherein $D_{OFF}$ is a decoded value of the offset bits OFF_BIT<2:0>:

$$I_{OFFTRIM}=I_{ZTAT} \cdot D_{OFF} \quad (Eq. 4)$$

The second trim unit 42 operates similarly to the first trim unit 41, except that rather than providing, to the ninth node N9, the offset trim current $I_{OFFTRIM}$ according to a value of the offset bits OFF_BIT<2:0>, the second trim unit 42 provides, to the eleventh node N11, a level trim current $I_{LEVEL\_TRIM}$ according to a value of the multi-level bits ML_BIT<2:0>. For convenience of explanation, FIG. 2 illustrates three multiple transistors corresponding to the three bits of the multi-level bits ML_BIT<2:0>. However, M multiple transistors are included in the second trim unit 42 when the multi-level bits ML_BIT include M bits <M-1:0>.

The level trim current $I_{LEVEL\_TRIM}$ flowing into the eleventh node N11 is determined according to Equation 5, below, wherein $D_{ML}$ is a decoded value of the multi-level bits ML_BIT<2:0>:

$$I_{LEVEL\_TRIM}=I_{ZTAT} \cdot D_{ML} \quad (Eq. 5)$$

The first enable switches En_TR1 included in the third trim unit 43 may perform a trimming operation according to multi-derivative first bits MD_BITB<2:0> and include '$N_{TRIM}$' PMOS multiple transistors having different sizes. For convenience of explanation, FIG. 2 illustrates three multiple transistors, specifically first, second, and third trim upper enable transistors ET1a, ET2a, and ET3a. However, when the $N_{TRIM}$ multiple transistors are included, the multi-derivative first bits MD_BITB may include '$N_{TRIM}$' bits <$N_{TRIM}$-1:0>.

When the first trim upper enable transistor ET1a having a gate to which a first multi-derivative first bit MD_BITB<0> is applied has a first size (×1), a the second trim upper enable transistor ET2a having a gate to which a second multi-derivative first bit MD_BITB<1> is applied may have a second size (×2) which is twice the first size, and the third trim upper enable transistor ET3a having a gate to which a third multi-derivative first bit MD_BITB<2> is applied may have a fourth size (×4) which is twice the second size. In an embodiment, the first, second, and third trim upper enable transistors ET1a, ET2a, and ET3a each include 1, 2, and 4 fourth sub-transistors connected in parallel, respectively, each fourth sub-transistor being substantially identical to each other.

The CTAT switches CTAT_TR included in the third trim unit 43, that is, first, second, and third CTAT transistors CT1, CT2, and CT3, may operate in response to the second current $I_{CTAT}$ and include '$N_{TRIM}$' PMOS multiple transistors having different sizes in the same manner as the first, second, and third trim upper enable transistors ET1a, ET2a, and ET3a, respectively. In an embodiment, the first, second, and third CTAT transistors CT1, CT2, and CT3 each include 1, 2, and 4 fifth sub-transistors connected in parallel, respectively, wherein each of the fifth sub-transistors are substantially identical to the fifth switch P5 of FIG. 1. Therefore, for each of the fifth sub-transistors, when a current flows through that fifth sub-transistor, that current is substantially identical to the second current $I_{CTAT}$, respectively.

The cascode switches CAS_TR included in the third trim unit 43, that is, fourth, fifth, and sixth cascode transistors CCT4, CCT5, and CCT6, are biased by the cascode voltage Vcas provided to gates thereof, and include '$N_{TRIM}$' PMOS multiple transistors in the same manner as the first enable switches En_TR1. In an embodiment, the first, second, and third cascode transistors CCT1, CCT2, and CCT3 each include 1, 2, and 4 sixth sub-transistors connected in parallel, respectively, each sixth sub-transistor being substantially identical to each other.

The multiple transistors of the first enable switches En_TR1, the CTAT switches CTAT_TR and the cascode switches CAS_TR of the third trim unit 43 may be coupled in series between the first node N1 and the eleventh node N11. For example, the first trim upper enable transistor ET1a, first CTAT transistor CT1, and fourth cascode transistor CCT4 having the same size may be coupled in series between the first node N1 and the eleventh node N11, the second trim upper enable transistor ET2a, second CTAT transistor CT2, and fifth cascode transistor CCT5 having the same size may be coupled in series between the first node N1 and the eleventh node N11, and so forth. Transistors having different sizes may be coupled in parallel between the first node N1 and the eleventh node N11.

The first, second, and third CTAT transistors CT1, CT2, and CT3 and the fourth, fifth, and sixth cascode transistors CCT4, CCT5, and CCT6 are connected at twelfth-first, twelfth-second, and twelfth-third nodes N12-1, N12-2, and N12-3, respectively. The twelfth-first, twelfth-second, and twelfth-third nodes N12-1, N12-2, and N12-3 are connected to components of the fifth trim unit 45, as will be described below.

The discharge unit 44 may include the eleventh switch P11 and a seventeenth switch P17. The eleventh switch P11 and the seventeenth switch P17 may include NMOS transistors coupled in series between the ninth node N9 and the second node N2. For example, the eleventh switch P11 may be coupled between the ninth node N9 and the seventeenth transistor P17 and operate in response to the offset trim current $I_{OFFTRIM}$ flowing into the ninth node N9 from the first trim unit 41. The seventeenth switch P17 may be coupled between the eleventh switch P11 and the second node N2 and operate in response to an enable signal En. When the enable signal En has a low level, the potential of the ninth node N9 may be at a low level, and the first and fourth trim units 41 and 45 may not perform a trimming operation.

In an embodiment, the eleventh switch P11 is configured to operate as the reference side of an amplifying current mirror circuit, wherein the fourth trim unit 45 operates as the output side of the current mirror circuit.

The sub-switches SUB_TR included in the fourth trim unit 45, that is, first, second, and third sub-switches ST1, ST2, and ST3, may perform a trimming operation in response to the potential of the ninth node N9 and include '$N_{TRIM}$' NMOS multiple transistors having different sizes, that is, the same number of NMOS multiple transistors as the third trim unit 43. In an embodiment, the first, second, and third sub-switches ST1, ST2, and ST3, include 1, 2, and 4 seventh sub-transistors connected in parallel, respectively, each seventh sub-transistor being substantially identical to the eleventh switch P11.

The second enable switches En_TR2 included in the fourth trim unit 45 may include '$N_{TRIM}$' NMOS multiple transistor having different sizes. The second enable switches En_TR2, that is, the first, second, and third trim lower transistors ET1b, ET2b, and ET3b, may operate in response to the multi-derivative second bits MD_BIT<2:0> and include '$N_{TRIM}$' multiple transistors having different sizes. For purpose of explanation, FIG. 2 illustrates three multiple transistors. However, when the $N_{TRIM}$ multiple transistors are included, the multi-derivative second bits MD_BIT may include '$N_{TRIM}$' bits <$N_{TRIM}$-1:0>. In an embodiment, the number of second enable switches En_TR2 included in the fourth trim unit 45 is identical to the number of first enable switches En_TR1 included in the third trim unit 43.

In an embodiment, when the first, second, and third trim upper transistors ET1a, ET2a, and ET3a are turned on, the first, second, and third trim lower transistors ET1b, ET2b, and ET3b are turned on, respectively, and when the first, second, and third trim upper transistors ET1a, ET2a, and ET3a are turned off, the first, second, and third trim lower transistors ET1b, ET2b, and ET3b are turned off, respectively. Accordingly, values of the multi-derivative first bits MD_BITB<2:0> may correspond to inverse values of the multi-derivative second bits MD_BIT<2:0>, respectively; that is, when a bit of the multi-derivative second bits MD_BIT<2:0> has one of a high or low value, the respective bit of the multi-derivative first bits MD_BITB<2:0> has the other of the high or low value.

More specifically, when the first trim lower transistor ET1b having a gate to which a multi-derivative second bit MD_BIT<0> is applied has a first size (×1), the second trim lower transistor ET2b having a gate to which an MD_BIT<1> is applied may have a second size (×2) which is twice as the first size, and the third trim lower transistor ET3b having a gate to which an MD_BIT<2> is applied may have a fourth size (×4) which is twice the second size. In an embodiment, the first, second, and third trim lower enable transistors ET1b, ET2b, and ET3b include 1, 2, and 4 eighth sub-transistors connected in parallel, respectively, each eighth sub-transistor being substantially identical to each other.

The multiple transistors included in the sub-switches SUB_TR and the second enable switches En_TR2 included in the fourth trim unit 45 may be coupled in series between the second node N2 and a connecting node between the CTAT switches CTAT_TR and the cascode switches CAS_TR of the third trim unit 43. For example, the first sub-switch ST1 and first trim lower enable transistor ET1b having the first size (×1) may be coupled in series between the twelfth-first node N12-1 and the second node N2, the second sub-switch ST2 and second trim lower enable transistor ET2b having the second size (×2) may be coupled in series between the twelfth-second node N12-2 and the second node N2, and so forth.

First, second, and third subtract currents $I_{SUB1}$, $I_{SUB2}$, and $I_{SUB3}$ flowing out of twelfth-first, twelfth-second, and twelfth-third nodes N12-1, N12-2, and N12-3 are respectively determined according to a value of the multi-derivative second bit MD_BIT<2:0> and the current flowing through the ninth node N9, that is, the offset current $I_{OFFTRIM}$. In the embodiment of FIG. 2, when the first multi-derivative second bit MD_BIT<0> turns on the first trim lower enable transistor ET1b, the first subtract current $I_{SUB1}$ equal to the offset current $I_{OFFTRIM}$ flows through the first sub-switch ST1 from the twelfth-first node N12-1. When the second multi-derivative second bit MD_BIT<1> turns on the second trim lower enable transistor ET2b, the second subtract current $I_{SUB2}$ equal to twice the offset current $I_{OFFTRIM}$ flows through the second sub-switch ST2 from the twelfth-second node N12-2. When the third multi-derivative second bit MD_BIT<2> turns on the third trim lower enable transistor ET3b, the third subtract current $I_{SUB3}$ equal to four times the offset current $I_{OFFTRIM}$ flows through the third sub-switch ST3 from the twelfth-third node N12-3.

The first, second, and third subtract currents $I_{SUB1}$, $I_{SUB2}$, and $I_{SUB3}$ flowing from the twelfth-first, twelfth-second, and twelfth-third nodes N12-1, N12-2, and N12-3 are subtracted from the currents flowing through the first, second, and third CTAT transistors CT1, CT2, and CT3 to determine the currents flowing through the fourth, fifth, and sixth cascode transistors CCT4, CCT5, and CCT6 into the eleventh node N11, respectively. Accordingly, in the embodiment shown in FIG. 2, a current $I_{TRIM3}$ flowing from the third trim unit 43 may be determined by Equation 6a, below, wherein $D_{MD}$ is a decoded value of the multi-derivative second bits MD_BIT<2:0>, and the decoded value of the multi-derivative first bits MD_BITB<2:0> is identical to $D_{MD}$:

$$I_{TRIM3} = I_{CTAT} \cdot D_{MD} - I_{OFFTRIM} \cdot D_{MD} \quad \text{(Eq. 6a)}$$
$$= D_{MD} \cdot (I_{CTAT} - I_{OFFTRIM})$$

In the embodiment of FIG. 2, a net current $I_{N11}$ flowing into the eleventh node N11 is equal to a sum of currents flowing out of the second and third trim units 42 and 43, and may be determined according to Equation 6b, below:

$$I_{N11} = I_{ZTAT} \cdot D_{ML} + D_{MD} \cdot (I_{CTAT} - I_{OFFTRIM}) \quad \text{(Eq. 6b)}$$

Combining Equations 4 and 6b produces Equation 6c:

$$I_{N11} = I_{ZTAT} \cdot D_{ML} + D_{MD} \cdot (I_{CTAT} - I_{ZTAT} \cdot D_{OFF}) \quad \text{(Eq. 6c)}$$
$$= D_{MD} \cdot I_{CTAT} + (D_{ML} - D_{MD} \cdot D_{OFF}) \cdot I_{ZTAT}$$

The net current $I_{N11}$ flows through the fifth resistor R5. As a result, the compensated voltage Vtemp produced by the compensated voltage output circuit 400B shown in FIG. 2 may be obtained by Equation 7, as follows:

$$V_{temp} = R5 \cdot (D_{MD} \cdot I_{CTAT} + (D_{ML} - D_{MD} \cdot D_{OFF}) \cdot I_{ZTAT}) \quad \text{(Eq. 7)}$$

wherein R5 is a resistance value of the fifth resistor R5, $D_{MD}$ is the decoded value of the multi-derivative second bits MD_BIT<2:0> corresponding to a derivative trim, $D_{ML}$ is a decoded value of the multi-level bits ML_BIT<2:0> corresponding to a level trim, and $D_{OFF}$ is a decoded value of the offset bits OFF_BIT<2:0> corresponding to an offset trim.

Figure 3:
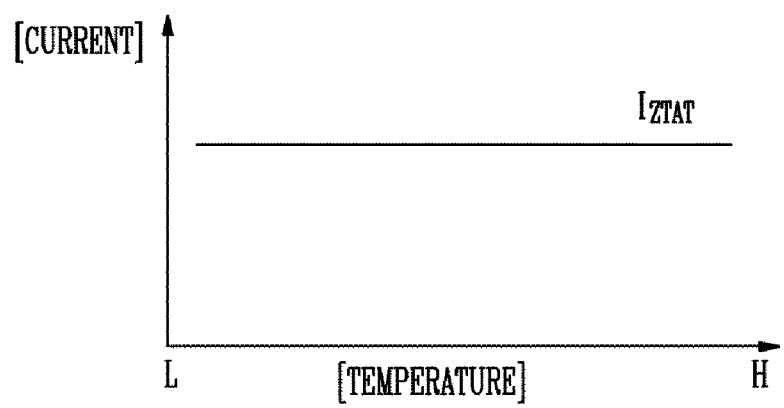
FIG. 3 is a graph illustrating a zero dependency on absolute temperature (ZTAT) current versus temperature according to an embodiment.
Figure 4:
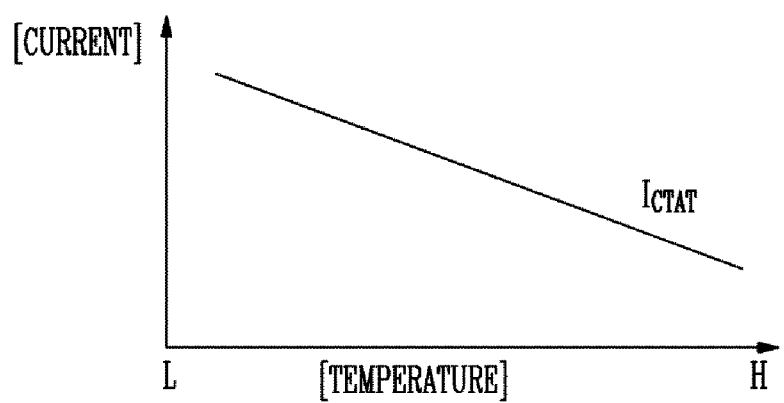
FIG. 4 is a graph illustrating a complementary-to-temperature (CTAT) current versus temperature according to an embodiment.

FIG. 3 is a graph illustrating a first current $I_{ZTAT}$ versus temperature. FIG. 4 is a graph illustrating a second current $I_{CTAT}$ versus temperature.

Referring to FIGS. 3 and 4, the first current $I_{ZTAT}$ may have a constant magnitude regardless of temperature changes, while the second current $I_{CTAT}$ may have a magnitude that varies in inverse proportion to a temperature. The first current $I_{ZTAT}$ and the second current $I_{CTAT}$ may be obtained by the first current generating circuit 100 and the second current generating circuit 300 shown in FIG. 1, respectively.

The second current $I_{CTAT}$ having the magnitude that varies in inverse proportion to a temperature may be obtained by Equation 8 as follows:

$$I_{CTAT} = I_C - \alpha I_C \cdot (T - T') \quad \text{(Eq. 8)}$$

wherein T is a sensed temperature, T' is a reference temperature, a calibration current $I_C$ is a value of the second current $I_{CTAT}$ at the reference temperature T', and $\alpha$ is a temperature coefficient. Therefore, when T and T' are equal to each other, the second current $I_{CTAT}$ may be the calibration current Ic. When the calibration current Ic has been determined, the first current $I_{ZTAT}$ and the decoded value $D_{OFF}$ of the offset bits OFF_BIT<2:0> may be configured according to Equation 9 as follows:

$$I_C = D_{OFF} \cdot I_{ZTAT} \Rightarrow D_{OFF} = I_C / I_{ZTAT} \quad \text{(Eq. 9)}$$

By solving the above-described equations, the compensated voltage Vtemp may be obtained by the following Equation 10:

$$V_{temp} = (D_{MD} \cdot (I_C - \alpha I_C \cdot (T - T')) + \quad \text{(Eq. 10)}$$
$$(D_{ML} - D_{MD} \cdot D_{OFF}) \cdot I_{ZTAT}) \cdot R5$$
$$= (D_{ML} \cdot I_{ZTAT} + D_{MD} \cdot (I_C - D_{OFF} \cdot I_{ZTAT})) \cdot R5 -$$
$$D_{MD} \cdot \alpha I_C \cdot (T - T') \cdot R5$$

When $I_{ZTAT}$ and $D_{OFF}$ are configured according to Equation 9, so that $D_{OFF} \cdot I_{ZTAT}$ is equal to the calibration current $I_c$, Equation 10 reduces to Equation 11:

$$V_{temp} = D_{ML} \cdot I_{ZTAT} \cdot R5 - D_{MD} \cdot \alpha I_C \cdot (T - T') \cdot R5 \quad \text{(Eq. 11)}$$

Referring to Equation 11, the compensated voltage Vtemp may be controlled by the offset bits OFF_BIT having the decoded value $D_{OFF}$, the multi-level bits ML_BIT having the decoded value $D_{ML}$, and the multi-derivative bits MD_BIT having the decoded value $D_{MD}$.

Figure 5:
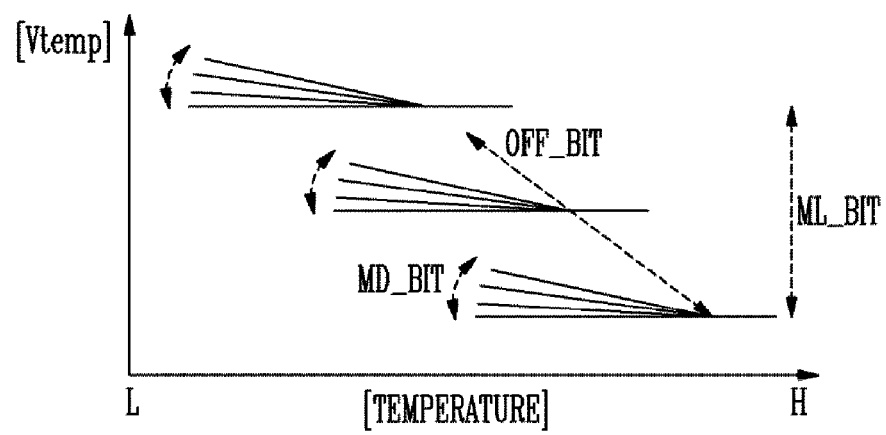
FIG. 5 is a graph illustrating a compensated voltage versus temperature according to an embodiment.

FIG. 5 is a graph illustrating a compensated voltage versus temperature.

Referring to FIG. 5, the offset bits OFF_BIT, the multi-level bits ML_BIT and the multi-derivative bits MD_BIT may be applied to the compensated voltage output circuit 400B, depending on temperature, whereby output of the compensated voltage Vtemp may be determined. For example, the zero point of the compensated voltage Vtemp at a predetermined temperature may be set according to the offset bits OFF_BIT, a level of the compensated voltage Vtemp may be determined by the multi-level bits ML_BIT, and a slope of the compensated voltage Vtemp may be determined by the multi-derivative bits MD_BIT.

When the above-described temperature sensor 1000 is used, the compensated voltage Vtemp capable of compensating for temperature changes may be used. Therefore, reliability of a semiconductor system using the temperature sensor 1000 may be improved. In addition, the temperature sensor 1000 may be applicable to various systems. For example, the temperature sensor 1000 may be used in apparatuses related to temperature, such as a semiconductor system, a ring-oscillator and a controller. According to an embodiment, a semiconductor system using the temperature sensor 1000 is described as an example below.

Figure 6:
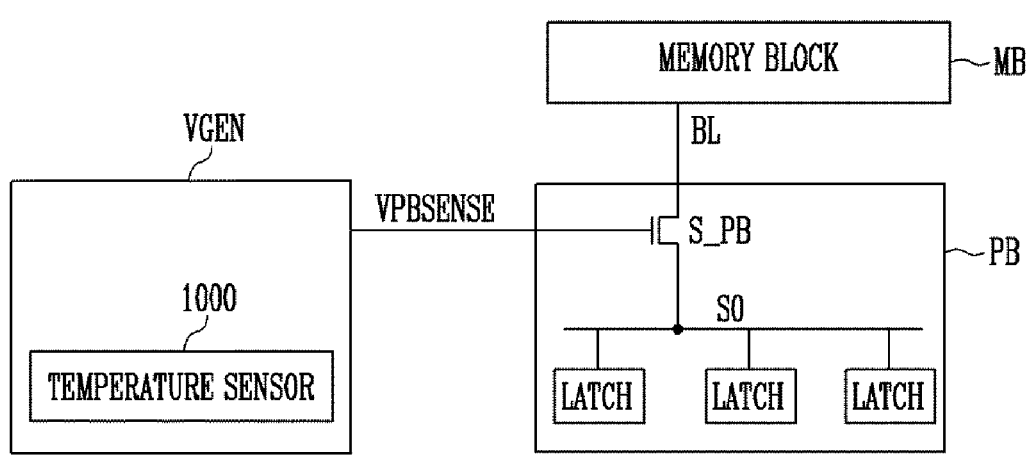
FIG. 6 is a schematic view illustrating a semiconductor system according to an embodiment.

FIG. 6 is a schematic view illustrating a semiconductor system 2000.

Referring to FIG. 6, the semiconductor system 2000 may include a memory block MB storing data, a page buffer PB coupled to the memory block MB through a bit line BL, and a voltage generator VGEN. The voltage generator VGEN may generate a sensing voltage VPBSENSE and supply the sensing voltage VPBSENSE to the page buffer PB. The semiconductor system 2000 may include various other peripheral circuits. However, for purpose of convenience, only the circuits relevant to the present disclosure are illustrated in FIG. 6.

The page buffer PB may include a plurality of latches LATCH used to temporarily store data. The latches LATCH may be coupled in common to a sensing node SO. A sensing switch S_PB may be coupled between the sensing node SO and the bit line BL, and the sensing switch S_PB may operate in response to the sensing voltage VPBSENSE. Since a turn-on level of the sensing switch S_PB is determined by the sensing voltage VPBSENSE during a read or verify operation, the voltage generator VGEN may output the sensing voltage VPBSENSE capable of compensating for temperature changes. Thus, the voltage generator VGEN may include the above-described temperature sensor 1000.

The voltage generator VGEN including the temperature sensor 1000 is described below in detail.

Figure 7:
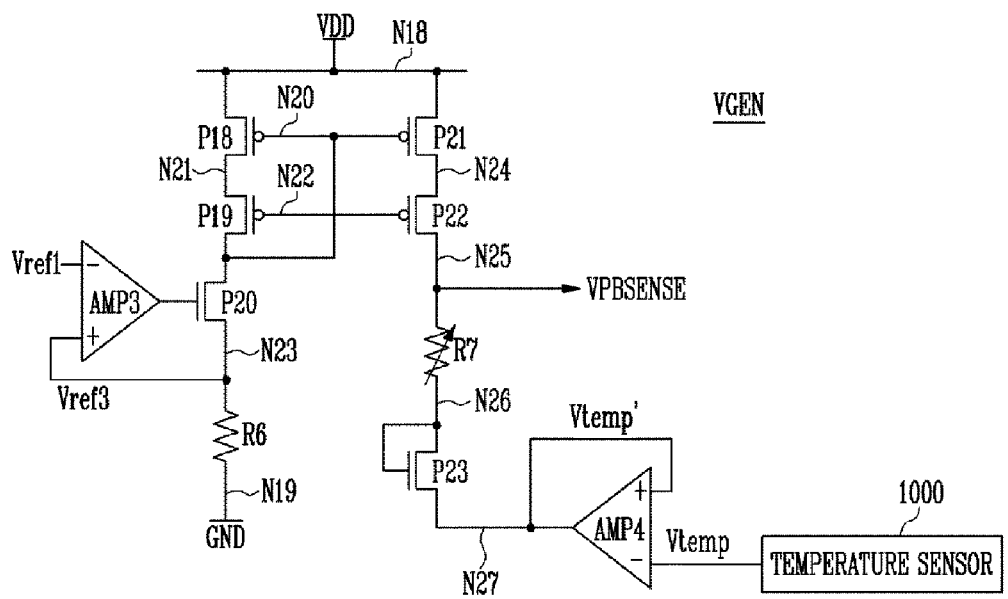
FIG. 7 is a circuit diagram illustrating a voltage generation circuit shown in FIG. 6 according to an embodiment.

FIG. 7 is a circuit diagram illustrating the voltage generator VGEN shown in FIG. 6 according to an embodiment.

Referring to FIG. 7, the voltage generator VGEN may be configured to generate the sensing voltage VPBSENSE using the compensated voltage Vtemp output from the temperature sensor 1000 and a mirrored current. The voltage generator VGEN includes eighteenth to twenty-third switches P18 to P23, third and fourth amplifiers AMP3 and AMP4, and sixth and seventh resistors R6 and R7. The third and fourth amplifiers AMP3 and AMP4 may include differential amplifiers.

More specifically, the eighteenth switch P18 may include a PMOS transistor coupled between the eighteenth node N18 to which the power voltage VDD is applied, and a twenty-first node N21, and a turn-on level thereof may be controlled in response to a voltage of a twentieth node N20. The nineteenth switch P19 may include a PMOS transistor coupled between the twenty-first node N21 and a twenty-second node N22, and a turn-on level thereof may be controlled in response to a voltage of the twenty-second node N22. The twenty-first switch P21 may include a PMOS transistor coupled between the eighteenth node N18 and a twenty-fourth node N24, and a turn-on level thereof may be controlled in response to the voltage of the twentieth node N20 coupled to the twenty-fourth node N24. The twenty-second switch P22 may include a PMOS transistor coupled between the twenty-fourth node N24 and a twenty-fifth node N25, and a turn-on level thereof may be controlled in response to the voltage of the twenty-second node N22. In other words, the eighteenth, nineteenth, twenty-first, and twenty-second switches P18, P19, P21, and P22 may have a current mirror configuration, which a person of skill in the art in light of the teachings and disclosures herein would recognize as a Wilson current mirror circuit.

The twentieth switch P20 may include an NMOS transistor coupled between the twenty-second node N22 and a twenty-third node N23 and operating in response to an output voltage of the third amplifier AMP3.

The third amplifier AMP3 may output, to a gate of the twentieth switch P20, a voltage corresponding to a difference between the bandgap reference voltage Vref1 and a feedback reference voltage Vref3. The sixth resistor R6 may be coupled between the twenty-third node N23 and a nineteenth node N19 coupled to the ground terminal GND. In an embodiment, the third amplifier AMP3 controls the twentieth switch P20 to produce a current flowing through the twentieth switch P20 equal to the bandgap reference voltage Vref1 divided by a resistance of the sixth resister R6.

The fourth amplifier AMP4 may compare the compensated voltage Vtemp output from the temperature sensor 1000 with a feedback reference voltage Vtemp' to determine a potential of a twenty-seventh node N27. The twenty-third switch P23 may be coupled between a twenty-sixth node N26 and the twenty-seventh node N27 and operate in response to the potential of the twenty-sixth node N26. The seventh resistor R7 may be coupled between the twenty-fifth node N25 and the twenty-sixth node N26 and include a variable resistor.

Figure 8:
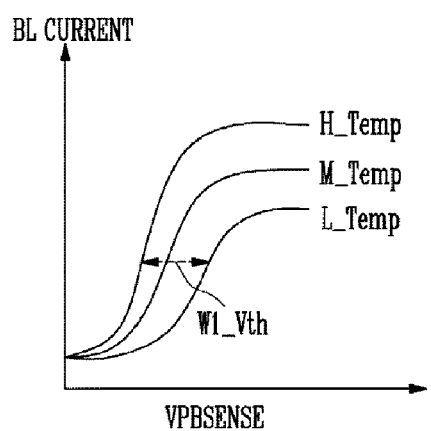
FIG. 8 is a graph illustrating a bit line current according to the related art.
Figure 9:
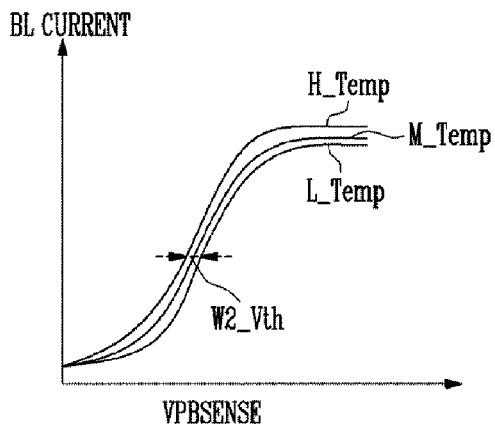
FIG. 9 is a graph illustrating a bit line current according to an embodiment.

FIG. 8 is a graph illustrating a bit line current according to the related art. FIG. 9 is a graph illustrating a bit line current according to an embodiment.

As illustrated in FIG. 8, when the sensing voltage VPBSENSE is not changed by temperature variations, the current of the bit line BL may have a variance W1_Vth having a large value as a temperature of the circuit ranges from a low temperature L_Temp, to a medium temperature M_Temp, and then to a high temperature H_Temp. However, as illustrated in FIG. 9, when the sensing voltage VPBSENSE having the compensated temperature variations is used, the variance of the current of the bit line BL from the low temperature L_Temp, to the medium temperature M_Temp, and then to the high temperature H_Temp may be reduced, i.e., the variance W2_Vth of the current of the bit line BL may have a smaller magnitude between the low temperature L_Temp and the high temperature H_Temp. Therefore, the current of the bit line BL may be sensed regardless of temperature changes, so that reliability of the semiconductor system may be improved.

Figure 10:
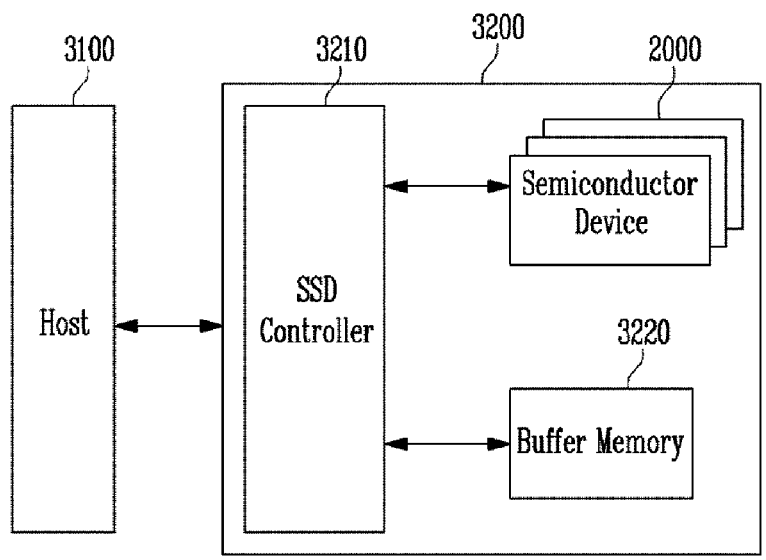
FIG. 10 is a block diagram illustrating a solid state drive including a semiconductor device according to an embodiment.

FIG. 10 is a block diagram illustrating a solid state drive including a semiconductor device according to an embodiment of the present disclosure.

Referring to FIG. 10, a drive device 3000 may include a host 3100 and an SSD 3200. The SSD 3200 may include an SSD controller 3210, a buffer memory 3220 and a semiconductor device 2000.

The SSD controller 3210 may provide a physical connection between the host 3100 and the SSD 3200. In other words, the SSD controller 3210 may perform interfacing with the SSD 3200 in response to a bus format of the host 3100. The SSD controller 3210 may decode a command provided from the host 3100. According to a decoding result, the SSD controller 3210 may access the semiconductor device 2000. As the bus format of the host 3100, Universal Serial Bus (USB), Small Computer System Interface (SCSI), Peripheral Component Interconnect Express (PCI-E), Advanced Technology Attachment (ATA), Parallel ATA (PATA), Serial ATA (SATA), and Serial Attached SCSI (SAS) may be included.

The buffer memory 3220 may temporarily store program data provided from the host 3100 or data read from the semiconductor device 2000. When a read request is made by the host 3100, if data in the semiconductor device 2000 is cached, the buffer memory 3220 may support a cache function to directly provide the cached data to the host 3100. In general, data transfer speed by the bus format (for example, SATA or SAS) of the host 3100 may be higher than the transfer speed of a memory channel of the SSD 3200. In other words, when an interface speed of the host 3100 is higher than the transfer speed of the memory channel of the SSD 3200, performance degradation caused by the speed difference may be minimized by providing a buffer memory 3220 having a large capacity. The buffer memory 3220 may be provided as Synchronous DRAM in order to provide sufficient buffering in the SSD 3200.

The semiconductor device 2000 may be provided as a storage medium of the SSD 3200. For example, the semiconductor device 2000 may be provided as a nonvolatile memory device having large storage capacity as described above in detail with reference to FIG. 1. The semiconductor device 2000 may be a NAND-type flash memory.

Figure 11:
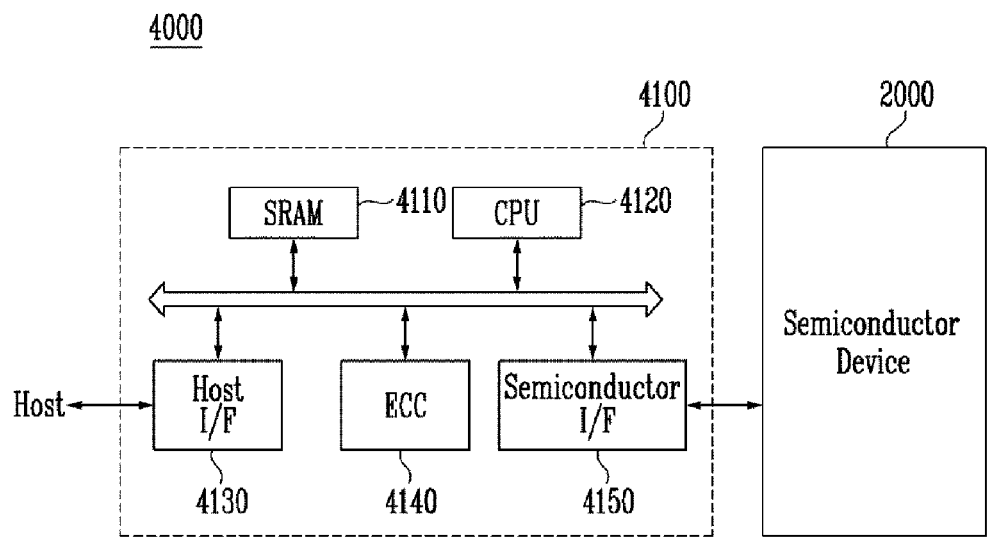
FIG. 11 is a block diagram illustrating a memory system including a semiconductor device according to an embodiment.

FIG. 11 is a block diagram illustrating a memory system including a semiconductor device according to an embodiment of the present disclosure.

Referring to FIG. 11, a memory system 4000 according to an embodiment may include a memory control unit 4100 and the semiconductor device 2000.

Since the semiconductor device 2000 may have substantially the same configuration as shown in FIG. 6, a detailed description thereof may be omitted.

The memory control unit 4100 may be configured to control the semiconductor device 2000. An SRAM 4110 may be used as a working memory of a CPU 4120. A host interface (I/F) 4130 may include a data exchange protocol of a host electrically coupled with the memory system 4000. An error correction circuit (ECC) 4140 in the memory control unit 4100 may detect and correct an error in data read from the semiconductor device 2000. A semiconductor I/F 4150 may interface with the semiconductor device 2000. The CPU 4120 may perform a control operation for data exchange of the memory control unit 4100. In addition, although not illustrated in FIG. 11, a ROM (not shown) for storing code data for interfacing with a host may be provided in the memory system 4000.

In an embodiment, the memory system 4000 may be applied to one of a computer, an Ultra Mobile PC (UMPC), a workstation, a net-book, a PDA, a portable computer, a web tablet, a wireless phone, a mobile phone, a smartphone, a digital camera, a digital audio recorder, a digital audio player, a digital picture recorder, a digital picture player, a digital video recorder, a digital video player, a device of transmitting and receiving information in a wireless environment, and various devices constituting a home network.

Figure 12:
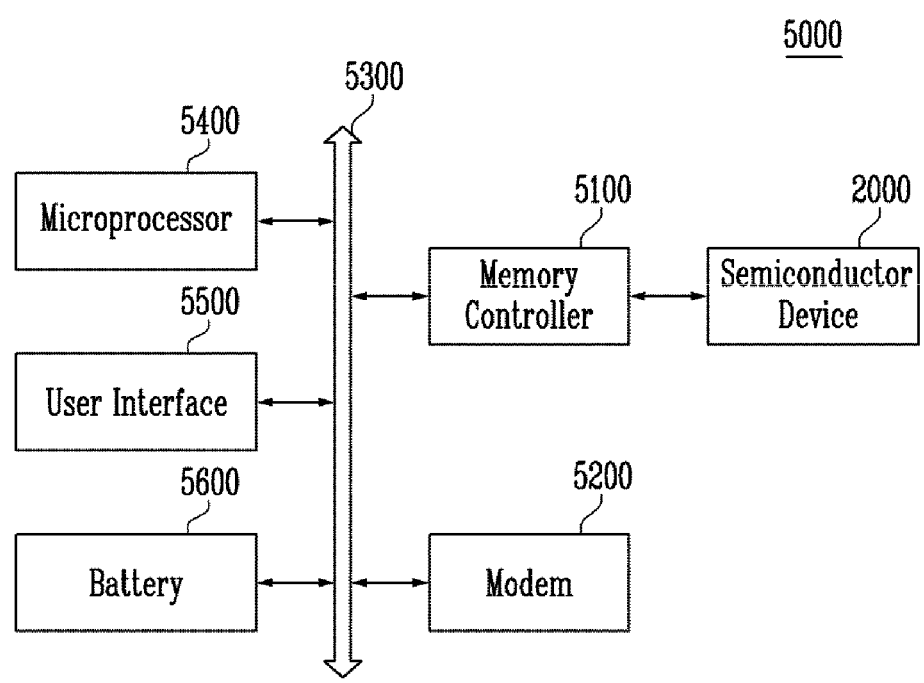
FIG. 12 is a schematic diagram illustrating the configuration of a computing system including a semiconductor device according to an embodiment.

FIG. 12 is a block diagram illustrating a computing system 5000 including a semiconductor device according to an embodiment of the present disclosure.

Referring to FIG. 12, the computing system 5000 includes the semiconductor device 2000 electrically coupled to a bus 5300, a memory controller 5100, a modem 5200, a microprocessor 5400, and a user interface 5500. When the computing system 5000 is a mobile device, a battery 5600 for supplying an operation voltage of the computing system 5000 may be additionally provided. The computing system 5000 may include an application chip set (not shown), a camera image processor (CIS) (not shown), a mobile DRAM (not shown), and the like.

The semiconductor device 2000 may be configured in substantially the same manner as the semiconductor device 2000 shown in FIG. 6. Thus, a detailed description thereof will be omitted.

The memory controller 5100 and the semiconductor device 2000 may be components of a Solid State Drive/Disk (SSD).

The semiconductor device 2000 and the memory controller 5100 may be mounted using various types of packages. For example, the semiconductor device 2000 and the memory controller 5100 may be mounted using packages such as Package on Package (PoP), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-level Processed Stack Package (WSP), and the like.

According to an embodiment, a temperature sensor having an output voltage controlled according to temperature may be provided, and a semiconductor system including the temperature sensor may operate regardless of temperature changes. In addition, since the semiconductor system operates regardless of temperature changes, a reduction in an operating speed and generation of a leakage current caused by temperature changes may be prevented.

What is claimed is:

1. A temperature sensor, comprising:
a first current generating circuit configured to generate a first current, the first current having a substantially constant magnitude regardless of temperature changes, wherein the first current generating circuit includes a first amplifier which generates the first current according to a bandgap reference voltage and a feedback voltage, wherein the bandgap voltage is not affected by the first current;
a cascode circuit configured to generate a cascode voltage;
a second current generating circuit configured to generate a second current, the second current having a magnitude that varies in inverse proportion to a temperature; and
a compensated voltage output circuit configured to output, using the first current and the second current, a compensated voltage having one or more predetermined temperature coefficients, wherein the compensated voltage has a value according to a temperature.

2. The temperature sensor of claim 1, wherein the first current generating circuit is configured to generate the first current by using a bandgap reference voltage.

3. The temperature sensor of claim 1, wherein the cascode circuit is configured to stably output the cascode voltage in response to the first current.

4. The temperature sensor of claim 1, wherein the second current generating circuit is configured to generate the second current using the cascode voltage.

5. The temperature sensor of claim 1, wherein the compensated voltage output circuit has a cascode current mirror configuration configured to output the compensated voltage having the one or more predetermined temperature coefficients.

6. A temperature sensor, comprising:
a first current generating circuit configured to generate a first current according to a bandgap reference voltage, wherein the first current has a constant magnitude regardless of temperature changes, wherein the bandgap voltage is not affected by the first current;
a cascode circuit configured to generate a cascode voltage according to the first current;
a second current generating circuit configured to generate a second current using the cascode voltage, wherein the second current has a magnitude that varies in inverse proportion to temperature; and
a compensated voltage output circuit suitable for outputting a compensated voltage having one or more predetermined temperature coefficients according to the first current and the second current, wherein the compensated voltage has a value according to a temperature.

7. The temperature sensor of claim 6, wherein the first current generating circuit comprises:
a first switch including a PMOS transistor coupled between a first node to which a power voltage is applied, and a third node, wherein a turn-on level of the first switch is controlled according to the first current;
a second switch including a PMOS transistor coupled between the third node and a fourth node from which a feedback reference voltage is generated, wherein a turn-on level of the second switch is controlled according to a potential of a connecting node between a first resistor and a second resistor;
the first resistor and the second resistor coupled in series between the fourth node and a second node coupled to a ground terminal; and
a first amplifier configured to control the magnitude of the first current using a difference between the bandgap reference voltage and the feedback reference voltage.

8. The temperature sensor of claim 6, wherein the cascode circuit comprises:
  a third switch including a PMOS transistor coupled between
  a first node to which a power voltage is applied, and a sixth node, wherein a turn-on level of the third switch is controlled according to the first current;
  a fourth switch including a PMOS transistor coupled between the sixth node and a seventh node, wherein a turn-on level of the fourth switch is controlled according to a potential of the seventh node; and
  a third resistor coupled between the seventh node and a second node coupled to a ground terminal.

9. The temperature sensor of claim 6, wherein the second current generating circuit comprises:
  a fifth switch including a PMOS transistor coupled between a first node to which a power voltage is applied, and a fourteenth node, wherein a turn-on level of the fifth switch is controlled according to the second current;
  a seventh switch including a PMOS transistor coupled between the fourteenth node and a fifteenth node, wherein a turn-on level of the seventh switch is controlled according to the cascode voltage;
  a fourth resistor coupled between the fifteenth node and a second node coupled to a ground terminal;
  a sixth switch including a PMOS transistor coupled between the first node and a sixteenth node, wherein a turn-on level of the sixth switch is controlled according to the second current;
  an eighth switch including a PMOS transistor coupled between the sixteenth node and a seventeenth node, wherein a turn-on level of the eighth switch is controlled according to the cascode voltage;
  a diode coupled between the seventeenth node and the second node, and outputting a second voltage to the seventeenth node; and
  a second amplifier configured to control the magnitude of the second current using a difference between a first voltage of the fifteenth node with the second voltage.

10. The temperature sensor of claim 6, wherein the compensated voltage output circuit includes a single cascode current mirror circuit or a multi-cascode current mirror circuit, or both.

11. The temperature sensor of claim 10, wherein the single cascode current mirror circuit comprises:
  a ninth switch including a PMOS transistor coupled between a first node to which a power voltage is applied, and an eighth node, wherein a turn-on level of the ninth switch is controlled according to the first current;
  a tenth switch including a PMOS transistor coupled between the eighth node and a ninth node, wherein a turn-on level of the tenth switch is controlled according to the cascode voltage;
  an eleventh switch including an NMOS transistor coupled between the ninth node and a second node coupled to a ground terminal, wherein the eleventh switch is turned on or off according to a potential of the ninth node;
  a twelfth switch including a PMOS transistor coupled between the first node and a tenth node, wherein a turn-on level of the twelfth switch is controlled according to the first current;
  a thirteenth switch including a PMOS transistor coupled between the tenth node and an eleventh node, wherein a turn-on level of the thirteenth switch is controlled according to the cascode voltage;
  a fourteenth switch including a PMOS transistor coupled between the first node and a twelfth node, wherein a turn-on level of the fourteenth switch is controlled according to the second current;
  a fifteenth switch including a PMOS transistor coupled between the twelfth node and the eleventh node, wherein a turn-on level of the fifteenth switch is controlled according to the cascode voltage;
  a sixteenth switch including an NMOS transistor coupled between the twelfth node and the second node, wherein the sixteen switch is turned on or off according to a potential of the ninth node; and
  a fifth resistor coupled between the eleventh node and the second node.

12. The temperature sensor of claim 10, wherein the multi-cascode current mirror circuit comprises:
  a first trim unit configured to perform a trimming operation according to the first current, the cascode voltage and offset bits;
  a second trim unit configured to perform a trimming operation according to the first current, the cascode voltage and multi-level bits;
  a third trim unit configured to perform a trimming operation according to the second current, the cascode voltage and multi-derivative bits;
  a fourth trim unit configured to perform a trimming operation according to the multi-derivative bits; and
  a discharge unit configured to activate or deactivate the first and fourth trim units.

13. The temperature sensor of claim 12, wherein the first trim unit includes a plurality of switch groups each including first enable switches, zero dependency on absolute temperature (ZTAT) switches, and cascode switches coupled in series between a first node to which a power voltage is applied and a ninth node coupled to the discharge unit, wherein the plurality of switch groups are coupled in parallel between the first node and the ninth node.

14. The temperature sensor of claim 13, wherein the first enable switches included in the plurality of switch groups include PMOS transistors each having a turn-on level controlled according to the offset bits,
  the ZTAT switches included in the switch groups include PMOS transistors each having a turn-on level controlled according to the first current, and
  the cascode switches included in the switch groups include PMOS transistors each having a turn-on level controlled according to the cascode voltage.

15. The temperature sensor of claim 12, wherein the second trim unit includes a plurality of switch groups each including first enable switches, ZTAT switches and cascode switches coupled in series between a first node to which a power voltage is applied and an eleventh node through which the compensated voltage is output, wherein the plurality of switch groups are coupled in parallel between the first node and the eleventh node.

16. The temperature sensor of claim 15, wherein the first enable switches included in the switch groups include PMOS transistors each having a turn-on level controlled according to the multi-level bits,
  the ZTAT switches included in the switch groups include PMOS transistors each having a turn-on level controlled according to the first current, and
  the cascode switches included in the switch groups include PMOS transistors each having a turn-on level controlled according to the cascode voltage.

17. The temperature sensor of claim 12, wherein the third trim unit includes a plurality of switch groups including first enable switches, complementary-to-temperature (CTAT) switches and cascode switches coupled in series between a first node to which a power voltage is applied, and an eleventh node through which the compensated voltage is output, wherein the plurality of switch groups are coupled in parallel between the first node and the eleventh node.

18. The temperature sensor of claim 17, wherein the first enable switches included in the switch groups include PMOS transistors each having a turn-on level controlled according to the multi-derivative bits, the CTAT switches included in the switch groups include PMOS transistors each having a turn-on level controlled according to the second current, and the cascode switches included in the switch groups include PMOS transistors each having a turn-on level controlled according to the cascode voltage.

19. The temperature sensor of claim 12, wherein the fourth trim unit comprises:

NMOS transistors coupled to the third trim unit and configured to operate according to an output voltage of the first trim unit; and NMOS transistors coupled between the NMOS transistors and a second node coupled to a ground terminal and configured to operate according to the multi-derivative bits.

20. The temperature sensor of claim 12, wherein the discharge unit comprises:

a first NMOS transistor coupled to the first trim unit and configured to operate according to an output voltage of the first trim unit; and a second NMOS transistor coupled between the first NMOS transistor and a second node coupled to a ground terminal and configured to operate according to an enable signal.

\* \* \* \* \*